(12) United States Patent
Niwa

(10) Patent No.: US 8,497,485 B2
(45) Date of Patent: Jul. 30, 2013

(54) IMAGING APPARATUS

(75) Inventor: Hiroaki Niwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 12/749,383

(22) Filed: Mar. 29, 2010

(65) Prior Publication Data

US 2010/0246770 A1    Sep. 30, 2010

(30) Foreign Application Priority Data

Mar. 31, 2009  (JP) .................................. 2009-086650

(51) Int. Cl.
*G01T 1/29*    (2006.01)
(52) U.S. Cl.
USPC ........................................................ 250/370.1
(58) Field of Classification Search
USPC ........................................................ 250/370.1
See application file for complete search history.

(56) References Cited

U.S. PATENT DOCUMENTS 6,403,964 B1 *   6/2002   Kyyhkynen ............. 250/370.09
2004/0046879 A1 *   3/2004   Ohzu et al. .................... 348/243

FOREIGN PATENT DOCUMENTS

| JP | 10093061 A | 4/1998 |
| JP | 2004289447 A | 10/2004 |
| JP | 2005-143802 A | 6/2005 |

* cited by examiner

*Primary Examiner* — David Porta
*Assistant Examiner* — Hugh H Maupin
(74) *Attorney, Agent, or Firm* — Canon U.S.A., Inc. IP Division

(57) ABSTRACT

An imaging apparatus includes an image sensor in which a plurality of area sensors arranged adjacent to each other to form an image sensor. A control circuit controls timing for reading out image data from each of the plurality of the area sensors based on area sensor arrangement information concerning the arrangement of each of the plurality of the area sensors.

12 Claims, 15 Drawing Sheets

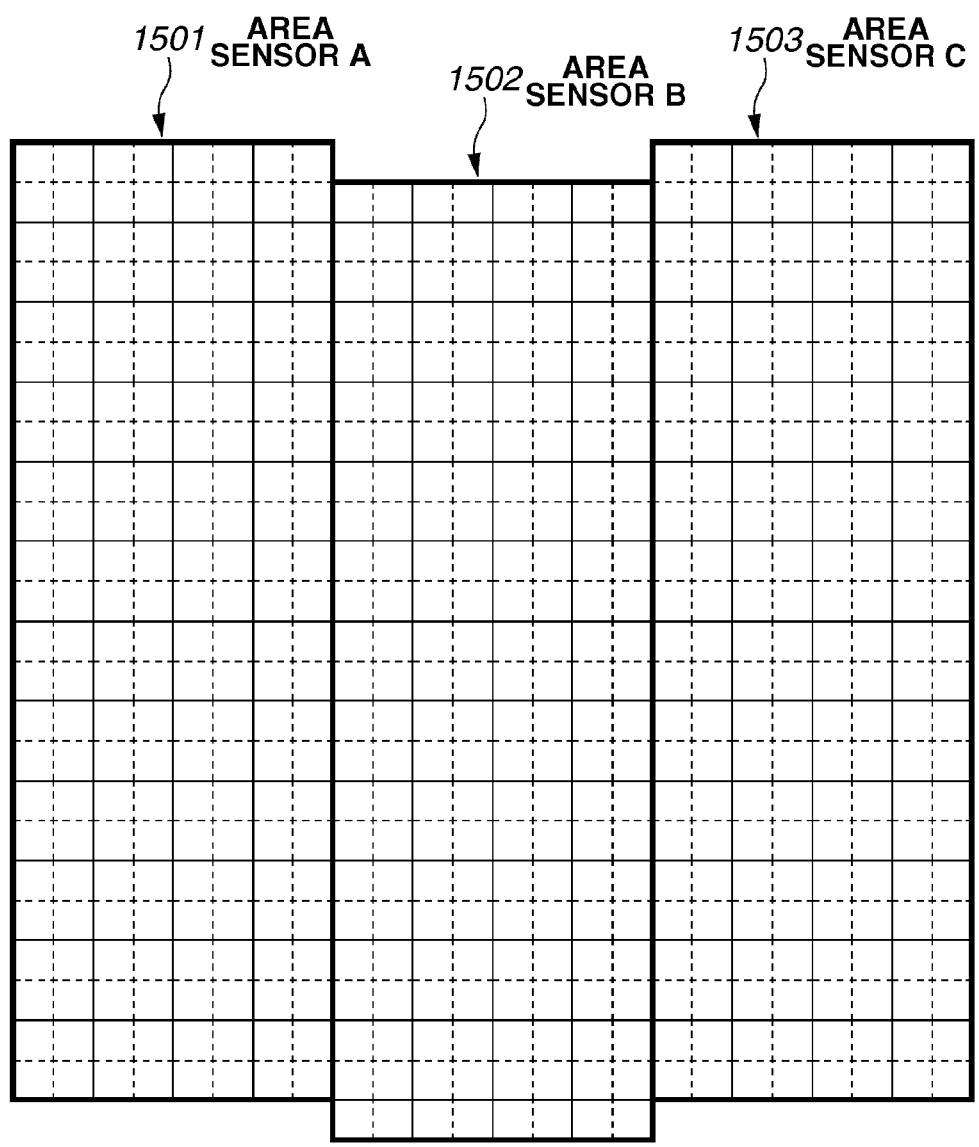

IMAGING APPARATUS

BACKGROUND OF THE INVENTION

1. Field of the Invention

The present invention relates to an imaging apparatus which includes an image sensor. More particularly, the present invention relates to an imaging apparatus that acquires radiation image data by using an image sensor according to a radiation ray transmitted through an object.

2. Description of the Related Art

In recent years, an X-ray imaging system that captures an X-ray image of an object as a digital image has been developed. Compared to conventional X-ray photograph systems that use a silver halide photograph, the X-ray imaging system is more practical in that it can record an X-ray image of an extremely wide exposure range.

More specifically, according to the X-ray imaging system, an X-ray of an extremely wide dynamic range is photoelectrically converted into an electric signal by, for example, phosphor. The obtained electric signal is read out and further converted into a digital signal.

According to the X-ray imaging system, since a digital signal is processed so that an X-ray image is output as a visible image on a recording material such as a photosensitive material or a display device such as a cathode ray tube (CRT), even if an X-ray exposure quantity varies to some extent, a good X-ray image can be obtained.

In an X-ray imaging apparatus used in the X-ray imaging systems, an image sensor such as a charge-coupled device (CCD) image sensor, a metal oxide semiconductor (MOS) image sensor, or a complementary MOS (CMOS) image sensor is used. Especially, the CMOS image sensor has high sensitivity and enables X-ray imaging in a low dose range. For example, Japanese Patent Application Laid-Open No. 2005-143802 discusses a technique concerning a radiation imaging system using a CMOS image sensor.

An imaging area of a large size such as 11 inch×11 inch is necessary for an image sensor used in the X-ray imaging apparatus. However, a size of the CMOS image sensor is generally smaller than the above-described size due to manufacturing process constraints. Accordingly, an appropriate sized imaging area of the CMOS image sensor is configured by putting a plurality of CMOS area sensors together, for example, in a tiled arrangement (in a matrix) to create one large imaging area.

Generally, a dedicated tool is used in putting the CMOS area sensors together. However, when one of the arranged CMOS area sensors needs to be removed for some reason such as a defect, it is difficult to set a new CMOS area sensor in a correct place without misregistration. For purposes of the present specification, the term "misregistration" may be broadly interpreted as a deviation from an intended position of an object, such that a spatial aberration is created. For example, in the abovementioned scenario, if a new CMOS area sensor is not placed in the exact correct location, a spatial aberration is created because the new CMOS area sensor may not be properly aligned with the other CMOS area sensors. Accordingly, when the CMOS area sensors are not aligned, an X-ray image obtained by the X-ray imaging apparatus using such CMOS area sensors may have pixel misregistration. Correction of the pixel misregistration by image processing using software is not practical since a frame rate will be reduced. Thus, it is difficult to repair the area sensors which are put together.

SUMMARY OF THE INVENTION

The present invention relates to an imaging apparatus capable of acquiring an image less affected by misregistration of an area sensor and without reducing a frame rate.

According to an aspect of the present invention, an imaging apparatus includes an image sensor in which a plurality of area sensors, each area sensor having a plurality of pixels, is arranged one-dimensionally or two-dimensionally. A control circuit is configured to control timing for reading out image data from each of the plurality of the area sensors based on area sensor arrangement information concerning arrangement of each of the plurality of the area sensors.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 is a schematic drawing illustrating an example of a separation position of the binning area of each of the area sensors of the X-ray imaging apparatus according to the third exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention will be described.

Figure 1:
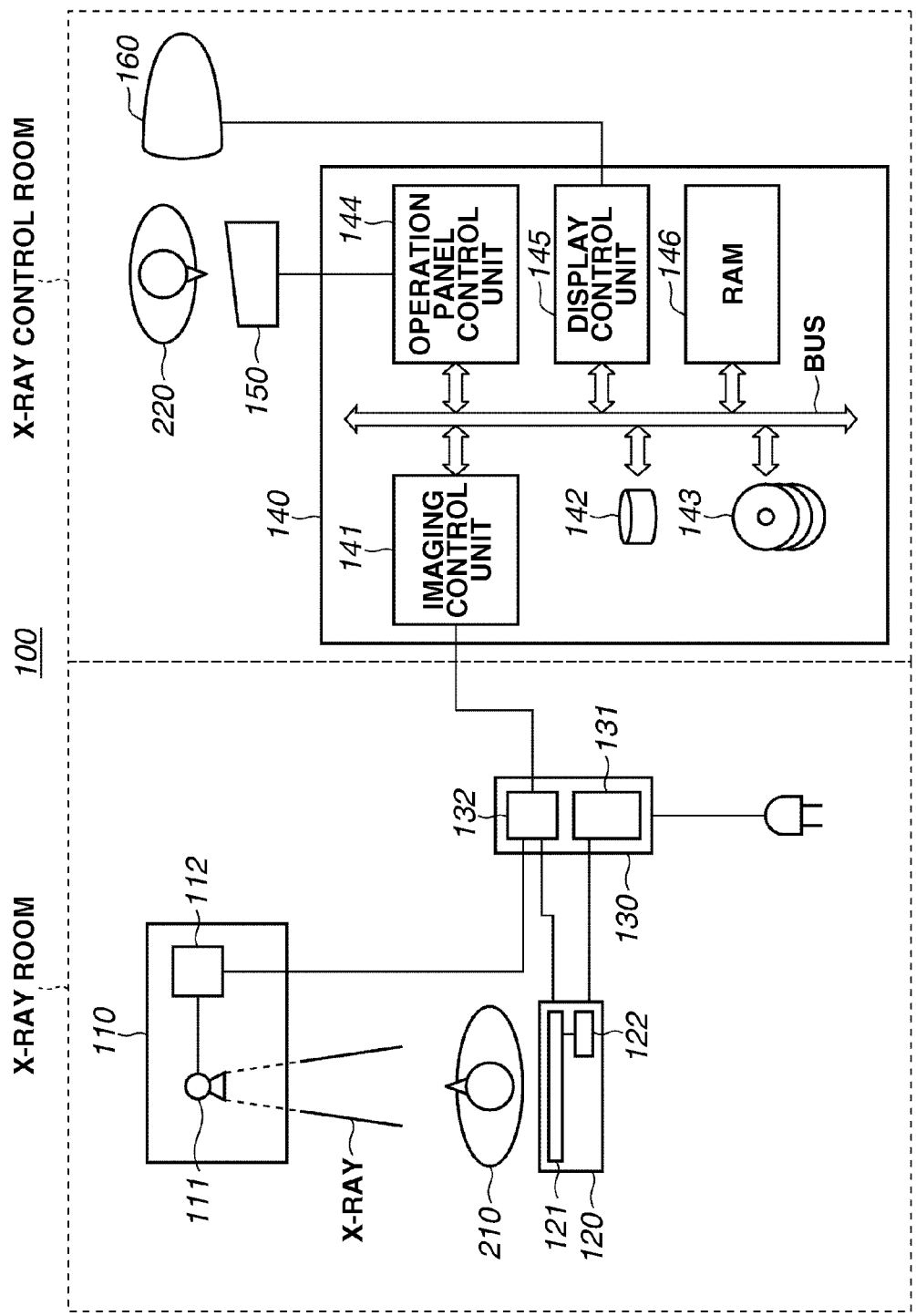
FIG. 1 is a schematic drawing illustrating an example of a configuration of an X-ray imaging system (radiation imaging system) according to a first exemplary embodiment of the present invention.

FIG. 1 is a schematic drawing illustrating an example of a configuration of an X-ray imaging system (radiation imaging system) 100 according to the first exemplary embodiment of the present invention. The X-ray imaging system 100 includes two rooms, an X-ray room and an X-ray control room.

As illustrated in FIG. 1, the X-ray imaging system 100 includes an X-ray generating apparatus 110, an X-ray imaging apparatus 120, an external unit 130, a system control apparatus 140, an operation panel 150, and a display 160.

According to the example illustrated in FIG. 1, the X-ray generating apparatus 110, the X-ray imaging apparatus 120, and the external unit 130 are set in the X-ray room, and the system control apparatus 140, the operation panel 150, and the display 160 are set in the X-ray control room. The X-ray generating apparatus (radiation generating apparatus) 110 includes an X-ray tube 111 which generates an X-ray (radiation) directed to an object 210, and a high voltage source 112 which drives the X-ray tube 111. An X-ray irradiation operation by the X-ray generating apparatus 110 is controlled by the system control apparatus 140 (to be more specific, an imaging control unit 141) via the external unit 130 (to be more specific, a control board 132).

The X-ray imaging apparatus (radiation imaging apparatus) 120 includes an image sensor 121 and a control circuit 122. The image sensor 121 is used for capturing an X-ray image (radiation image) based on X-rays transmitted through the object 210. The control circuit 122 controls operations of the image sensor 121. The image sensor 121 is, for example, a CMOS image sensor. Further, the X-ray imaging operation performed by the X-ray imaging apparatus 120 is controlled by the control circuit 122 controlling the operations of the image sensor 121 according to the control of the system control apparatus 140 (the imaging control unit 141) via the external unit 130 (the control board 132).

The external unit 130 includes a power supply unit 131 and the control board 132. The power supply unit 131 supplies operation power to the X-ray imaging apparatus 120. The control board 132 controls the high voltage source 112 and the X-ray imaging apparatus 120 according to the control of the system control apparatus 140 (the imaging control unit 141).

As illustrated in FIG. 1, the system control apparatus 140 includes the imaging control unit 141, a hard disk 142, an external storage unit 143, an operation panel control unit 144, a display control unit 145, a random access memory (RAM) 146, and a bus.

The imaging control unit 141 performs various controls concerning X-ray imaging of the object 210. For example, according to an instruction from an operator 220, the imaging control unit 141 executes X-ray imaging operations by synchronizing the X-ray generating apparatus 110 and the X-ray imaging apparatus 120.

The hard disk 142 and the external storage unit 143 store various programs necessary for the processing of the system control apparatus 140 as well as various types of data and information.

The operation panel control unit 144 performs various controls concerning the operation panel 150. For example, the operation panel control unit 144 causes the operation panel 150 to change its display according to the operation by the operator 220.

The display control unit 145 performs various controls concerning display of the display 160.

The RAM 146 temporarily stores various types of data and information necessary for the processing performed by the system control apparatus 140.

Each of the units (141 to 146) included in the system control apparatus 140 is communicably connected via the bus in the system control apparatus 140.

Further, although not shown in FIG. 1, a communication interface (I/F) that is used in communication with an external apparatus can be included in the system control apparatus 140. Further, the X-ray image data (radiation image data) transmitted from the X-ray imaging apparatus 120 to the system control apparatus 140 is stored, for example, in the RAM 146. According to a request from the operator 220, the X-ray image data stored in the RAM 146 is displayed on the display 160, stored in the hard disk 142, or stored in the external storage unit 143.

The operation panel 150 is operated by the operator 220 and is used for inputting an instruction entered by the operator 220 to the system control apparatus 140. The operation panel 150 is controlled by the operation panel control unit 144.

The display 160 displays various images and various types of information according to the control of the display control unit 145.

Next, an internal structure of the X-ray imaging apparatus 120 will be described.

Figure 2:
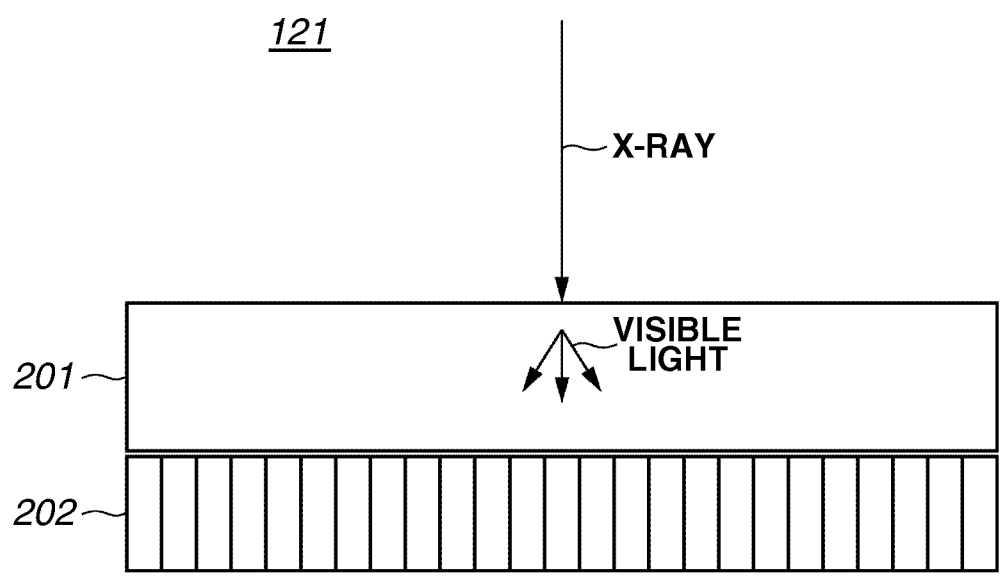
FIG. 2 is a schematic drawing illustrating an example of a cross section of an image sensor illustrated in FIG. 1.

FIG. 2 is a schematic drawing illustrating an example of a cross section of the image sensor 121 illustrated in FIG. 1. As illustrated in FIG. 2, the image sensor 121 includes a phosphor 201 and a plurality of pixels 202 each of which includes a photoelectric conversion element. In addition to what is illustrated in FIG. 2, the image sensor 121 includes various circuits.

The phosphor 201 converts the X-ray transmitted through the object 210 into visible light. More specifically, when a base material of the phosphor 201 is excited by (absorbs) a high energy X-ray, fluorescence in a visible region is generated by recombination energy. The fluorescence is generated according to the base material of the phosphor 201 such as $CaWO_4$ or $CdWO_4$ or by a luminescent center material, for example, CsI:Tl or ZnS:Ag, added to the base material of the phosphor 201.

The pixels 202 are arranged, for example, in a two-dimensional matrix. The pixel 202 converts the visible light which is obtained by the conversion performed by the phosphor 201 into a charge as an electric signal by the photoelectric conversion element therein. Then, the image sensor 121 reads out image signals according to the charges accumulated for a certain period of time at a high signal-to-noise ratio (S/N) from all the pixels.

Figure 3:
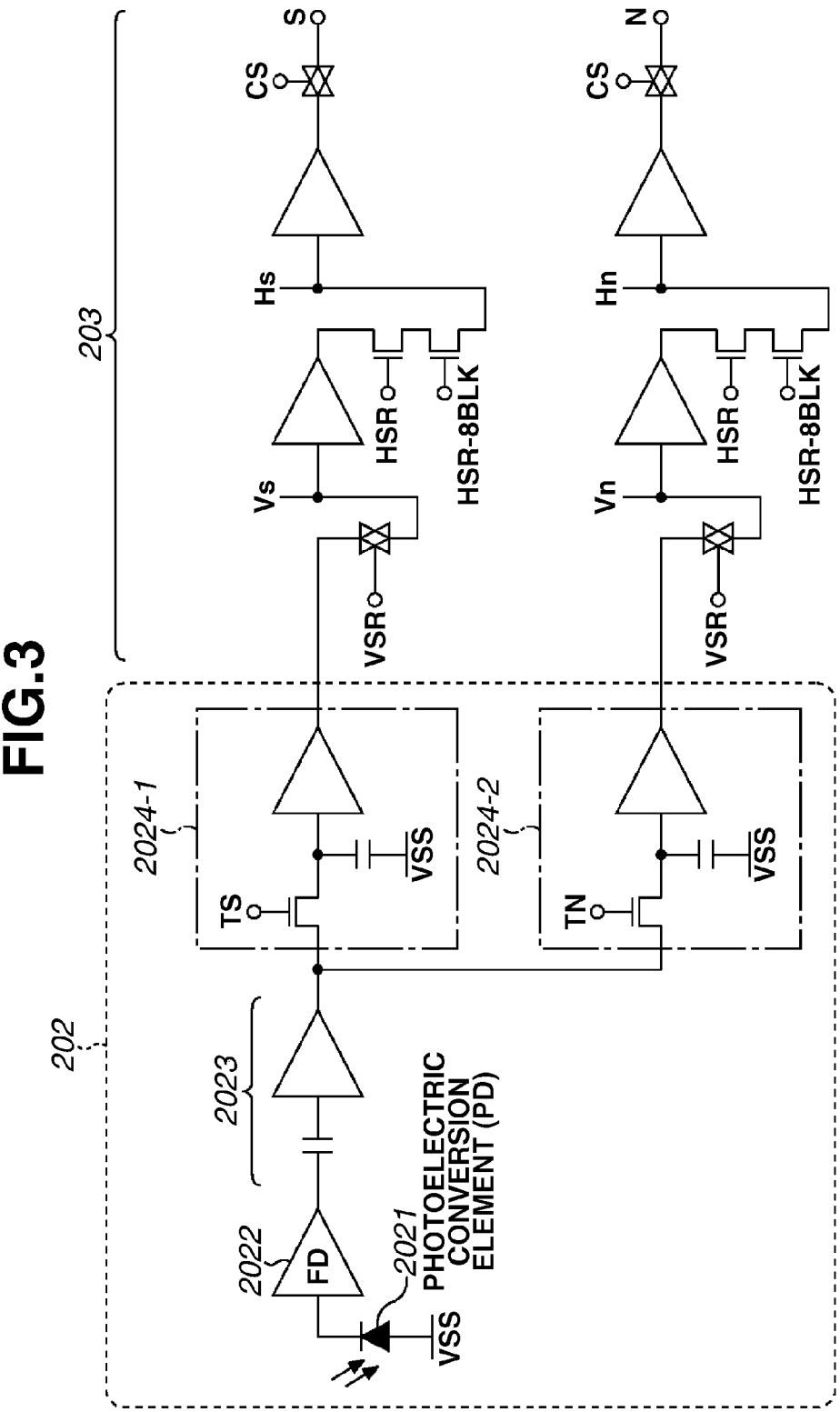
FIG. 3 is a schematic drawing illustrating an example of an equivalent circuit of one pixel illustrated in FIG. 2.

FIG. 3 is a schematic drawing illustrating an example of an equivalent circuit of one of the pixels 202 illustrated in FIG. 2. FIG. 3 illustrates a read-out matrix circuit 203 included in the image sensor 121. The read-out matrix circuit 203 is used for reading out an image signal corresponding to the charge from the pixel 202.

As illustrated in FIG. 3, the pixel 202 includes a photoelectric conversion element 2021 which is formed by a photodiode (PD), a floating diffusion (FD) amplifier 2022, a clamp circuit 2023, and sample hold circuits 2024-1 and 2024-2.

The photoelectric conversion element 2021 converts the visible light converted by the phosphor 201 (see FIG. 2) into a charge which is an electric signal. The FD amplifier 2022 converts the signal charge obtained by the photoelectric conversion element 2021 into a signal voltage and also amplifies it.

The clamp circuit 2023 is provided after the FD amplifier 2022, and the sample hold circuits 2024-1 and 2024-2 are provided after the clamp circuit 2023. The sample hold circuits 2024-1 and 2024-2 independently perform sampling and holding of a PD signal voltage S and a clamp voltage N, respectively. In other words, the signal output from the pixel 202 is supplied to two independent systems of an analog S and an analog N.

Further, a reset circuit (not shown) for resetting all the pixels at the same time is included in the image sensor 121. According to this reset circuit, all the pixels are reset at the same time, and after the exposure, the sampling and holding of the output from the FD amplifier 2022 of all the pixels is performed by the sample hold circuits 2024-1 and 2024-2 at the same time. Thus, a collective electronic shutter can be realized.

The read-out matrix circuit 203 is controlled by control signals VSR, HSR, and HSR-8BLK. The VSR signal is output by a vertical scanning circuit (vertical direction static shift register: VSR) used for sequentially selecting a horizontal line in the vertical (V) direction. The HSR signal is output by a horizontal scanning circuit (horizontal direction static shift register: HSR) used for selecting a pixel in the horizontal (H) direction. Based on the VSR, HSR and HSR-8BLK signals, the read-out matrix 203 sequentially reads out image signals according to the signal charges of all the pixels.

The image sensor 121 of the present exemplary embodiment includes a plurality of CMOS area sensors, which include a plurality of pixels 202, arranged in one-dimensional array or in two-dimensional array. For example, the CMOS area sensor has a high resolution 896×896 pixel matrix structure.

Figure 4:
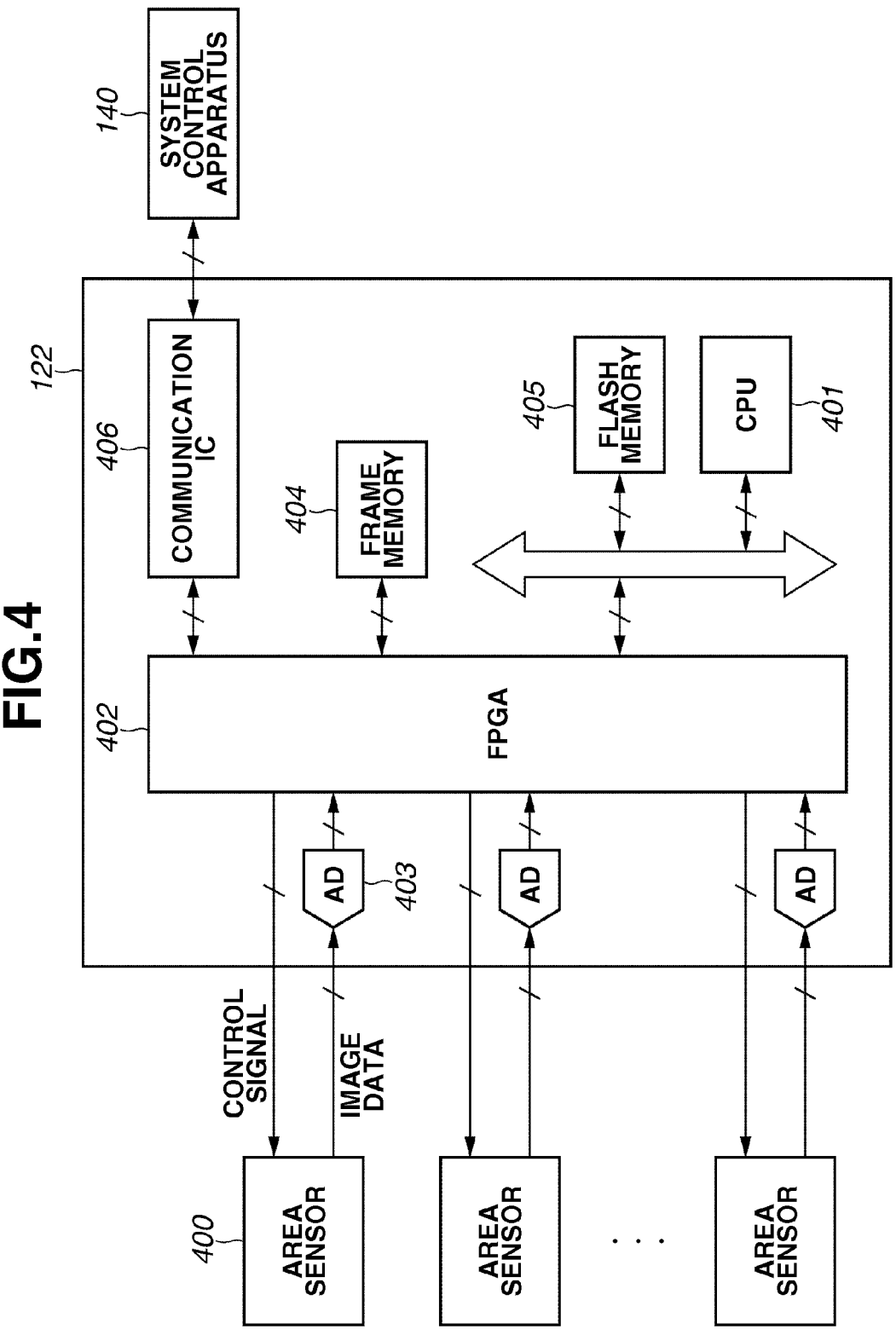
FIG. 4 is a block diagram illustrating an example of an inner configuration of a control circuit in the X-ray imaging apparatus illustrated in FIG. 1.

FIG. 4 is a block diagram illustrating an example of an inner configuration of the control circuit 122 in the X-ray imaging apparatus 120 illustrated in FIG. 1. Further, in FIG. 4, the above-described CMOS area sensors are illustrated as area sensors 400.

As illustrated in FIG. 4, the control circuit 122 includes a central processing unit (CPU) 401, a field programmable gate array (FPGA) register 402, an analog to digital (AD) conversion integrated circuit (IC) 403, a frame memory 404, a flash memory 405, and a communication IC 406.

The CPU 401 comprehensively controls various types of control processing performed by the control circuit 122. The FPGA register 402 generates a sensor control signal used for controlling the area sensor 400 according to the control of the CPU 401. The FPGA register 402 generates the sensor control signal for each area sensor 400.

Further, each of the area sensors 400 outputs image data (radiation image data) based on an image signal to the AD conversion IC 403 based on the sensor control signal. The AD conversion IC 403 converts the image data transmitted from each of the area sensors 400 into digital data and outputs it to the FPGA register 402.

The FPGA register 402 stores the image data transmitted from each AD conversion IC 403 in the frame memory 404 based on, for example, the control of the CPU 401.

Commands and images are transmitted between the X-ray imaging apparatus 120 (the control circuit 122) and the system control apparatus 140 via the communication IC 406. The communication system between the X-ray imaging apparatus 120 and the system control apparatus 140 uses optical communication or high speed differential communication so as to realize high frame rate.

The CPU 401 also controls imaging timing of each area sensor 400 and the command communication between the system control apparatus 140. Area sensor arrangement information related to the misregistration of each area sensor 400 is, for example, transmitted from the system control apparatus 140 and stored in advance in the flash memory 405 via the CPU 401.

Figure 5:
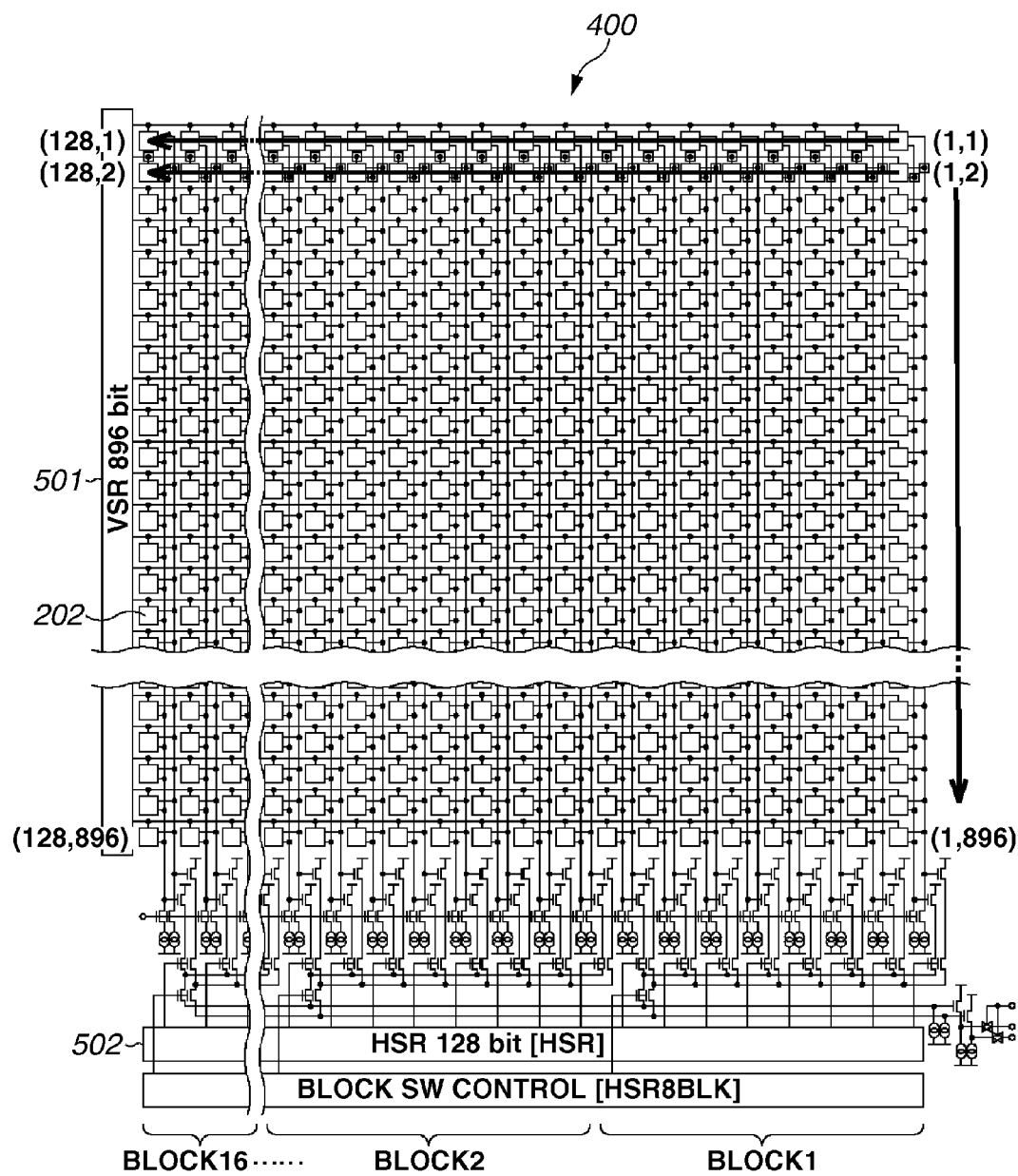
FIG. 5 is a schematic drawing illustrating an example of a pixel charge read-out structure of an area sensor illustrated in FIG. 4.

Next, drive control of the area sensor 400 will be described. FIG. 5 is a schematic drawing illustrating an example of a charge read-out structure of a pixel of the single area sensor 400 illustrated in FIG. 4.

Using a V-Start signal (VST) as a trigger, a V-direction static shift register (VSR) 501 sequentially outputs a VSR signal for controlling output of 128 pieces of the pixels 202 in a row in synchronization with a rising edge or a falling edge of a V-Clock signal (CLKV).

Using an H-Start signal (HST) as a trigger, an H-direction static shift register (HSR) 502 sequentially outputs an HSR signal for selecting one pixel from the 128 pixels selected by the VSR signal in synchronization with a rising edge of an H-Clock signal (CLKH).

According to the present exemplary embodiment, the VSR 501 and the HSR 502 are shift registers for outputting selection. Further, the VST and the HST are used as drive start signals of the shift registers VSR 501 and the HSR 502 for outputting selection. Furthermore, according to the present exemplary embodiment, assert timing of the VST and/or the HST is controlled by the control circuit 122 for each area sensor 400 and image misregistration due to the misregistration of the area sensor 400 is corrected by controlling hardware.

Figure 6:
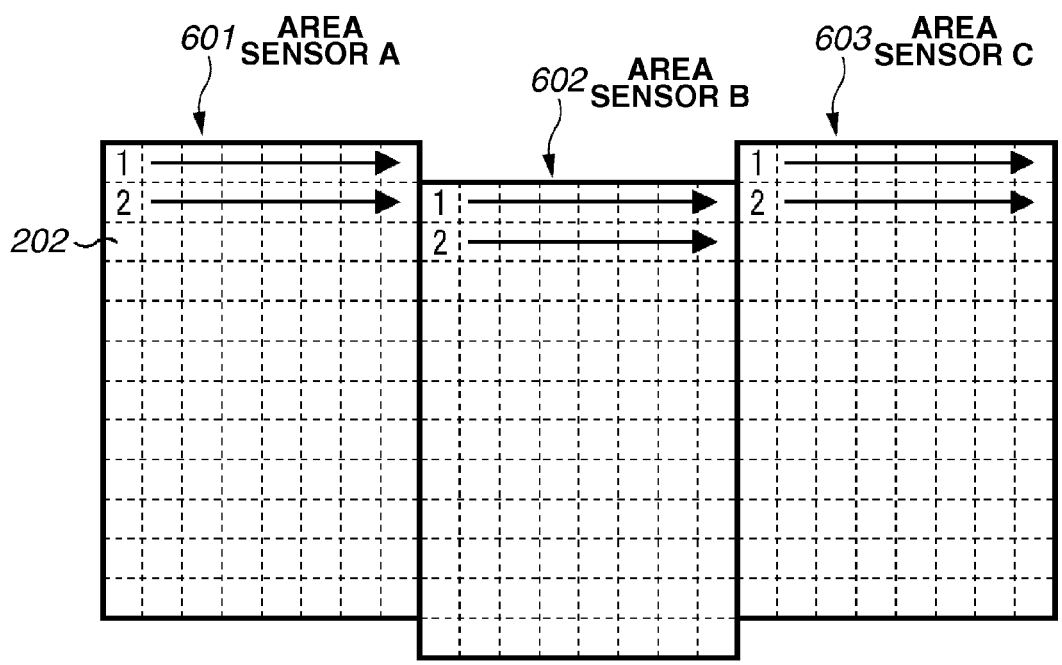
FIG. 6 is a schematic drawing illustrating an example of a plurality of area sensors that configure the image sensor illustrated in FIG. 1.

FIG. 6 is a schematic drawing illustrating an example of a plurality of area sensors that form the image sensor 121 illustrated in FIG. 1. In FIG. 6, an area sensor A 601, an area sensor B 602, and an area sensor C 603 are put together and arranged as the area sensor 400 illustrated in FIG. 4. Further, in FIG. 6, the area sensor B 602 is displaced (shifted) one pixel with respect to the area sensors A 601 and C 603.

Figure 7:
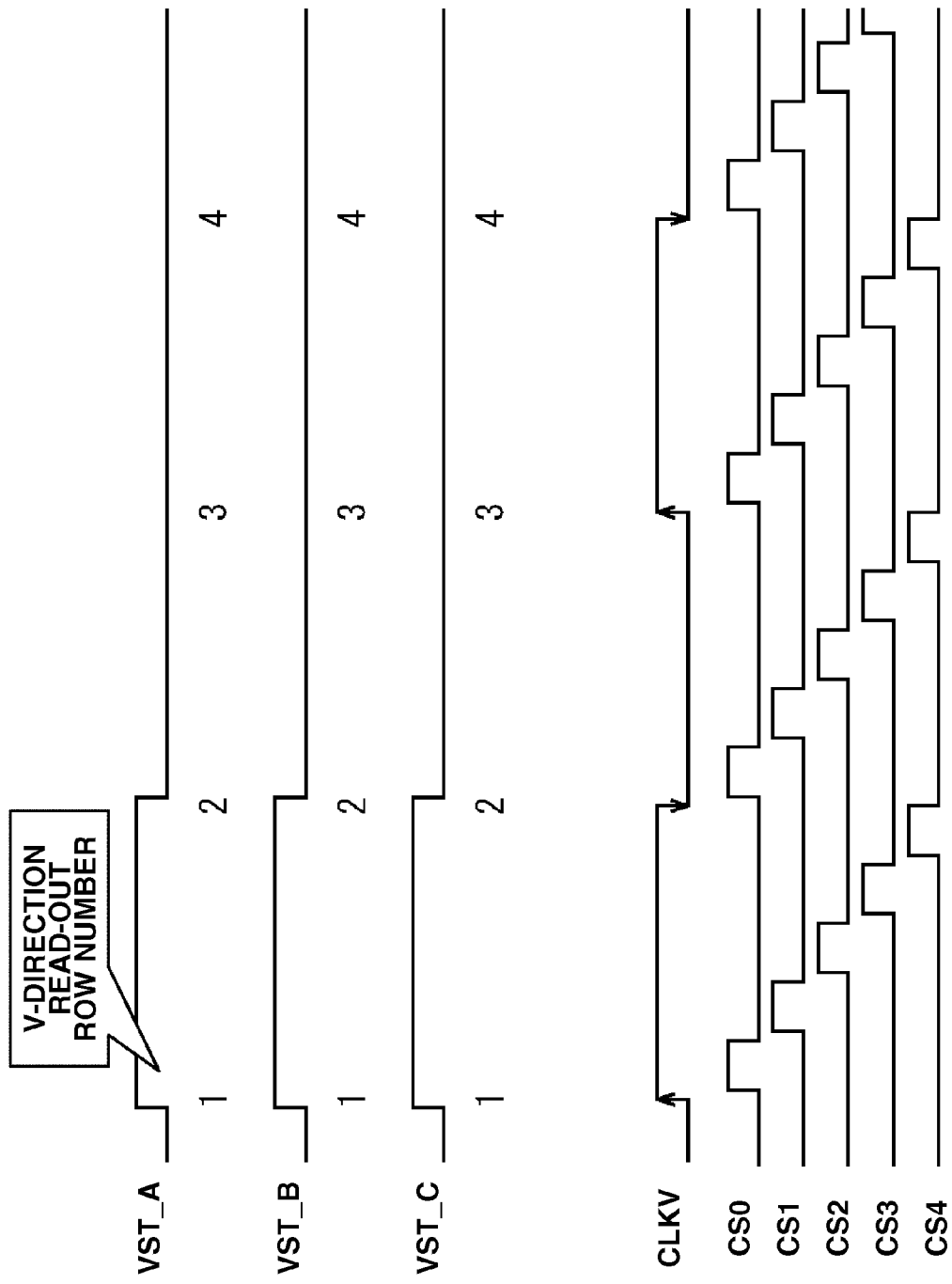
FIG. 7 illustrates a conventional example of a timing chart concerning read-out drive timing of image data of each of the area sensors in the X-ray imaging apparatus.

FIG. 7 illustrates a conventional example of a timing chart concerning read-out drive timing of image data of each area sensor of the X-ray imaging apparatus. As illustrated in FIG. 7, when the VST assert timing is uniquely determined for each of the area sensors (the area sensors A 601 to C 603 in FIG. 6), each area sensor reads out an output signal of a pixel on the same line at the same timing. More specifically, the pixels of the first row of the area sensor B 602, which is physically on the same line of the pixels of the second row of the area sensors A 601 and C 603, are read out at the timing same as the timing when the pixels of the first row of the area sensors A 601 and C 603 are read out. As a result, the pixels of the area sensor B 602 are read out at timing different from positions they are actually arranged and thus pixel misregistration occurs on the X-ray image.

According to the present exemplary embodiment, based on the area sensor arrangement information stored in the flash memory 405, the assert timing of VST is controlled for each area sensor by the control circuit 122. The control by the control circuit 122 is described in detail below referring to FIG. 8.

Figure 8:
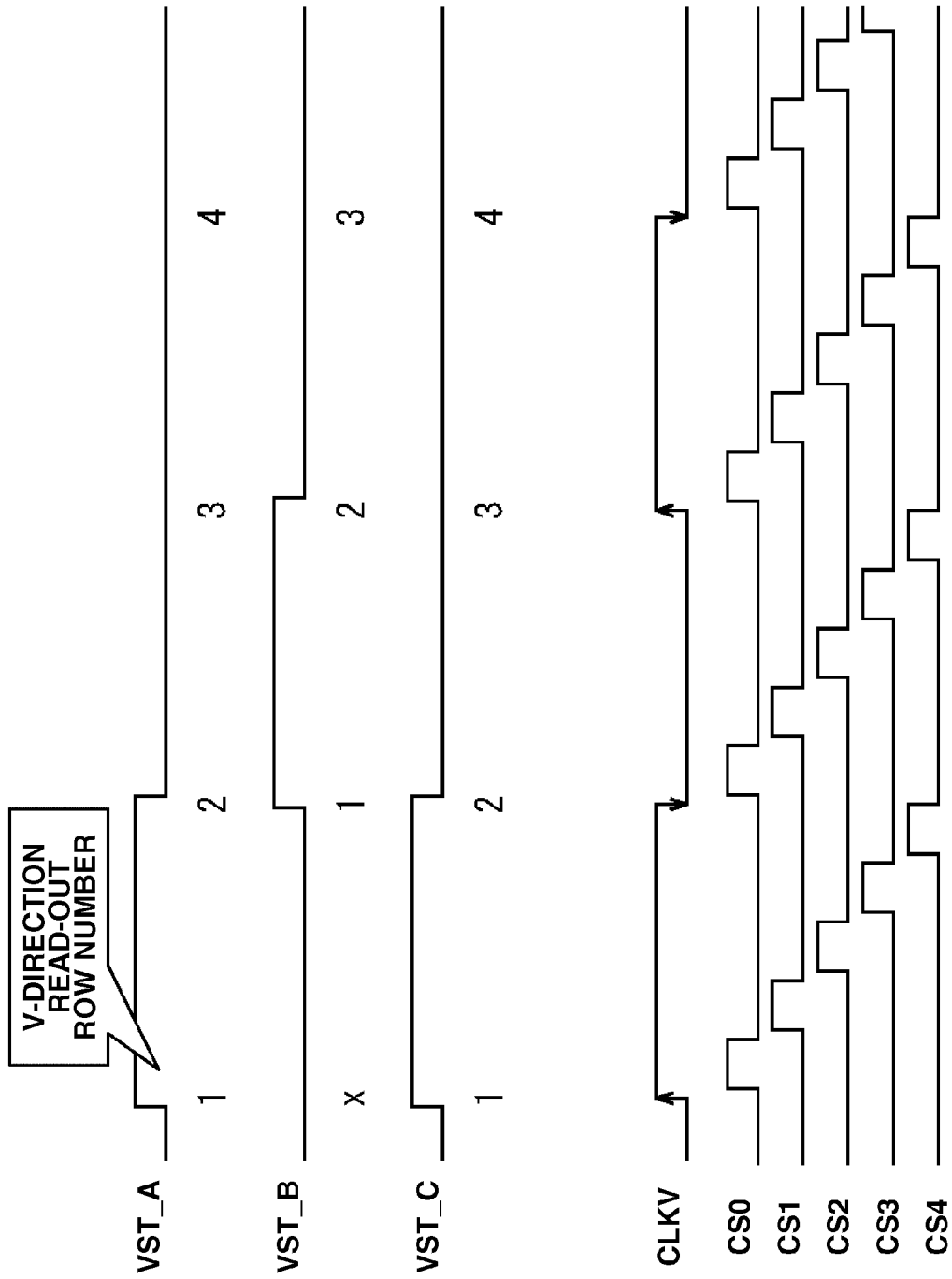
FIG. 8 illustrates an example of a timing chart concerning read-out drive timing of image data of each of the area sensors in the X-ray imaging apparatus according to the first exemplary embodiment of the present invention.

FIG. 8 illustrates an example of a timing chart concerning the read-out drive timing of image data by each area sensor in the X-ray imaging apparatus 120 according to the first exemplary embodiment of the present invention.

The control circuit 122 controls the image sensor 121 illustrated in FIG. 6 so that the VST assert timing of the area sensor B 602 is delayed for 1 CLKV edge as illustrated in FIG. 8. As a result, the pixels of the second row of the area sensors A 601 and C 603 and the pixels of the first row of the area sensor B 602 are read out at the same timing. Accordingly, an X-ray image in which the pixel misregistration has been corrected can be obtained.

Figure 9:
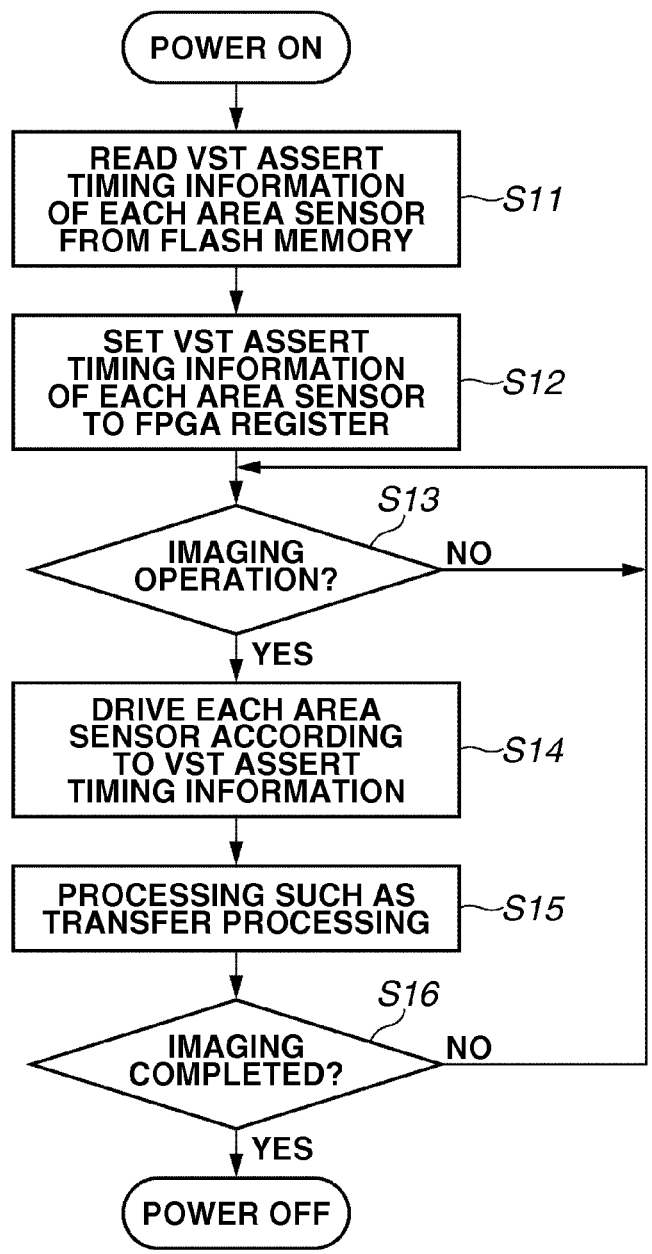
FIG. 9 is a flowchart illustrating an example of processing procedures of a control method of the X-ray imaging apparatus (radiation imaging apparatus) according to the first exemplary embodiment of the present invention.

FIG. 9 is a flowchart illustrating an example of processing procedures of a control method of the X-ray imaging apparatus (radiation imaging apparatus) 120 according to the first exemplary embodiment of the present invention. Although an example of controlling the above-described VST is described below, the above-described HST can also be controlled by a similar manner.

First, before the processing in FIG. 9 is started, the control circuit 122 receives area sensor arrangement information related to the misregistration of each area sensor 400 of the image sensor 121 from, for example, the system control apparatus 140 and stores the information in the flash memory 405. More specifically, the area sensor arrangement information is obtained by inspection, such as microscopic examination or grid moire image inspection, according to inspection processes performed in advance. Then, the area sensor arrangement information is transmitted from the system control apparatus 140 to the control circuit 122.

Further, before the processing in FIG. 9 is started, the control circuit 122 (the CPU 401) determines the VST assert timing of each area sensor 400 according to the area sensor arrangement information stored in the flash memory 405. Then, the control circuit 122 (the CPU 401) stores VST assert timing information concerning the determined VST assert timing of each area sensor 400 in the flash memory 405.

In step S11, when the power supply unit 131 is turned on, the CPU 401 reads out the VST assert timing information of each area sensor 400 from the flash memory 405 before a start of the X-ray imaging of the object 210.

In step S12, the CPU 401 sets the VST assert timing information of each area sensor 400 obtained in step S11 in the FPGA register 402. The VST assert timing information is set individually for each area sensor 400.

In step S13, the CPU 401 determines whether an instruction to start the imaging operation is given from the imaging control unit 141.

If the imaging instruction is not given from the imaging control unit 141 (NO in step S13), the CPU 401 waits until the imaging instruction is given from the imaging control unit 141.

If the imaging instruction is given from the imaging control unit 141 (YES in step S13), the process proceeds to step S14.

In step S14, the FPGA register 402 controls the VST assert timing of each area sensor 400 according to the VST assert timing information of each area sensor 400 set in step S12 and drives each area sensor 400. Accordingly, an X-ray image of the object 210 is taken by the image sensor 121.

In step S15, the FPGA register 402 receives the image data at predetermined timing from each area sensor 400 via the AD conversion IC 403 and stores the image data in the frame memory 404. Further, for example, the CPU 401 transfers the image data stored in the frame memory 404 to an external apparatus such as the system control apparatus 140 as needed. According to the processing in steps S13 to S15, an imaging operation of one frame is completed.

In step S16, the CPU 401 determines whether an imaging end instruction is transmitted from the imaging control unit 141.

If no imaging end instruction is transmitted from the imaging control unit 141 (NO in step S16), then the process returns to step S13 and the X-ray imaging of the next frame is performed.

If the imaging end instruction is transmitted from the imaging control unit 141 (YES in step S16), then the processing ends and power of the power supply unit 131 is turned off.

According to the first exemplary embodiment, the assert timing of VST and/or HST is adjusted for each area sensor by the control circuit 122 based on the area sensor arrangement information. Thus, according to the first exemplary embodiment, an X-ray image with the pixel misregistration of each area sensor corrected by hardware control can be acquired. In other words, an X-ray image in which influence of the misregistration of the area sensor is reduced can be acquired without decreasing the frame rate.

Since the pixel misregistration of each area sensor is corrected in units of one pixel according to the present exemplary embodiment, the correction is useful when the pixel misregistration is ½ pixel or greater. More specifically, even if pixel misregistration of ½ pixel or greater occurs due to the misregistration of the area sensors, the pixel misregistration can be corrected by controlling hardware, and an X-ray image with reduced influence of the misregistration can be acquired. Further, although the control circuit 122 acquires the area sensor arrangement information from the system control apparatus 140 and determines the VST assert timing based on the acquired area sensor arrangement information, according to the present exemplary embodiment, the VST assert timing can also be determined by the following embodiment. For example, the imaging control unit 141 can determine the VST assert timing based on the area sensor arrangement information. Then, by acquiring the VST assert timing information from the imaging control unit 141, the control circuit 122 can control each of the area sensors.

Next, a second exemplary embodiment of the present invention will be described below.

The configurations of the X-ray imaging system and the X-ray imaging apparatus according to the second exemplary embodiment are similar to those of the X-ray imaging system 100 and the X-ray imaging apparatus 120 of the first exemplary embodiment. According to the second exemplary embodiment, the control performed by the control circuit 122 is different from that of the first exemplary embodiment.

Figure 10:
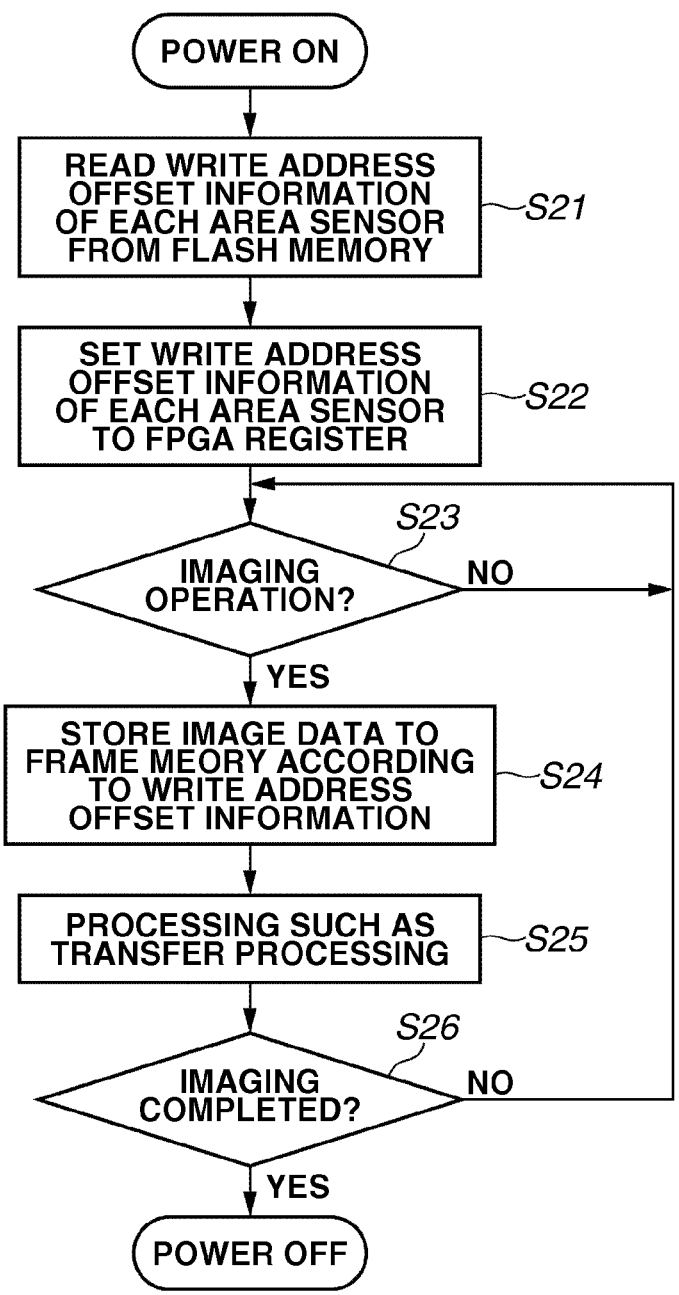
FIG. 10 is a flowchart illustrating an example of processing procedures of a control method of the X-ray imaging apparatus (radiation imaging apparatus) according to a second exemplary embodiment of the present invention.

FIG. 10 is a flowchart illustrating an example of processing procedures of a control method of the X-ray imaging apparatus (radiation imaging apparatus) 120 according to the second exemplary embodiment of the present invention.

First, as is with the first exemplary embodiment, before the processing in FIG. 10 is started, the control circuit 122 receives area sensor arrangement information related to the misregistration of each area sensor 400 of the image sensor 121 from, for example, the system control apparatus 140 and stores the information in the flash memory 405. More specifically, as is with the first exemplary embodiment, the area sensor arrangement information is obtained by inspection, such as microscopic examination or grid moire image inspection, according to inspection processes performed in advance. Then, the area sensor arrangement information is transmitted from the system control apparatus 140 to the control circuit 122.

Further, the control circuit 122 (the CPU 401) determines write address offset for when the image data obtained from each area sensor 400 is written in the frame memory 404 according to the area sensor arrangement information stored in the flash memory 405. Then, the control circuit 122 (the CPU 401) stores write address offset information concerning the determined write address offset in the flash memory 405.

In step S21, when the power supply unit 131 is turned on, the CPU 401 reads out the write address offset information of each area sensor 400 from the flash memory 405 before a start of the X-ray imaging of the object 210.

In step S22, the CPU 401 sets the write address offset information of each area sensor 400 obtained in step S21 in the FPGA register 402. The write address offset information is set individually for each area sensor 400.

In step S23, the CPU 401 determines whether an instruction to start the imaging operation is given from the imaging control unit 141. If the imaging instruction is not given from the imaging control unit 141 (NO in step S23), the CPU 401 waits until the imaging instruction is given from the imaging control unit 141.

If the imaging instruction is given from the imaging control unit 141 (YES in step S23), the process proceeds to step S24.

In step S24, the FPGA register 402 transmits a control signal to each area sensor 400 according to the control of the CPU 401 and acquires image data from each area sensor 400 via the AD conversion IC 403. Then, according to the write address offset information of each area sensor 400 set in step S22, the FPGA register 402 writes the acquired image data into the frame memory 404 while controlling the write address of the frame memory 404.

According to the present exemplary embodiment, since the write address offset is controlled when the image data is written into the frame memory 404 for each area sensor 400, an X-ray image in which the pixel misregistration has been corrected can be stored at the time the image data is written into the frame memory 404. Since the writing into the frame memory 404 is performed by burst writing while the write start address is being updated, writing speed according to the present exemplary embodiment is not reduced.

In step S25, the CPU 401 transfers the image data stored in the frame memory 404 to an external apparatus such as the system control apparatus 140 as needed. According to the processing in steps S23 to S25, an imaging operation of one frame is completed.

In step S26, the CPU 401 determines whether an imaging end instruction is transmitted from the imaging control unit 141.

If no imaging end instruction is transmitted from the imaging control unit 141 (NO in step S26), then the process returns to step S23 and the X-ray imaging of the next frame is performed.

If the imaging end instruction is transmitted from the imaging control unit 141 (YES in step S26), then the processing ends and power of the power supply unit 131 is turned off.

In this way, according to the second exemplary embodiment, an X-ray image in which the pixel misregistration of each area sensor has been corrected can be acquired by adjusting the write address offset at the time the image data obtained from each area sensor is written into the frame memory based on the area sensor arrangement information. Thus, the pixel misregistration of each area sensor in the X-ray image data is corrected then the X-ray image data is read out from the frame memory and output to an external apparatus such as a system control apparatus.

Since the pixel misregistration of each area sensor is corrected in units of one pixel according to the present exemplary embodiment, the correction is useful when the pixel misregistration is ½ pixel or greater. More specifically, even if pixel misregistration of ½ pixel or greater occurs due to the misregistration of the area sensors, the pixel misregistration can be corrected by controlling hardware, and an X-ray image with reduced influence of the misregistration can be acquired.

Further, although the control circuit 122 acquires the area sensor arrangement information from the system control apparatus 140 and determines the write address offset based on the area sensor arrangement information, according to the present exemplary embodiment, the write address offset can also be determined by the following embodiment. For example, the imaging control unit 141 can determine the write address offset according to the area sensor arrangement information. Then, by acquiring the write address offset information from the imaging control unit 141, the control circuit 122 can control the writing of the image data from each area sensor.

Next, a third exemplary embodiment of the present invention will be described below. In addition to the control for correcting the pixel misregistration due to the misregistration of each area sensor 400 according to the above-described first and the second exemplary embodiments, a separation position of a binning area of the area sensor 400 whose pixels are to be corrected is changed according to the third exemplary embodiment.

Figure 11:
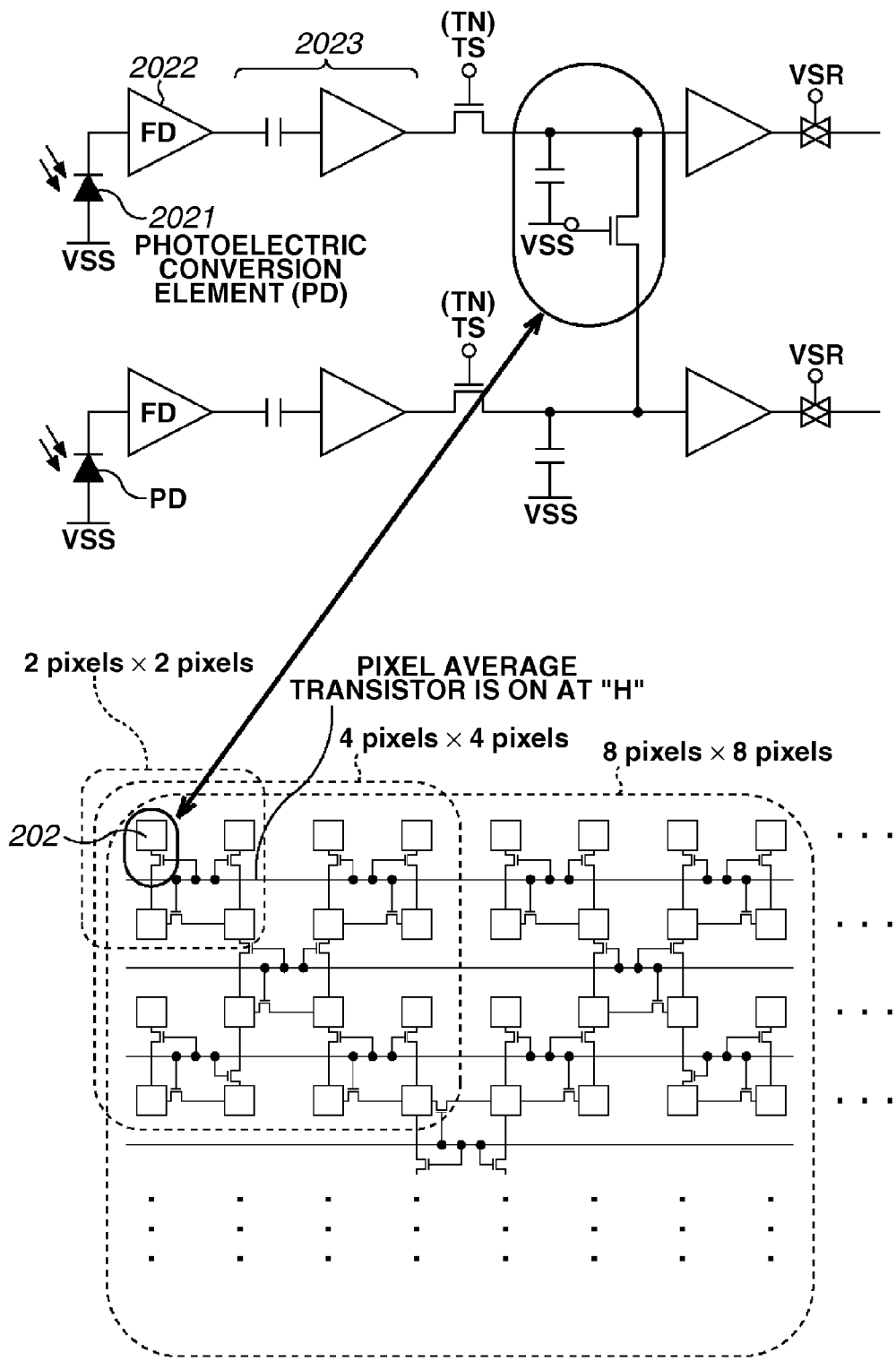
FIG. 11 is a schematic drawing illustrating an example of a binning read-out mode of an image sensor according to a third exemplary embodiment of the present invention.

A binning read-out mode of the X-ray imaging apparatus 120 according to the present exemplary embodiment will be described below. FIG. 11 is a schematic drawing of the image sensor 121 describing an example of the binning read-out mode according to the third exemplary embodiment of the present invention. In FIG. 11, the components which have functions similar to those in FIG. 3 are denoted by the same reference numerals.

The image sensor 121 illustrated in FIG. 11 includes a pixel average transistor which is directly connected to a sample hold capacitor and a function to short-circuit the sample hold capacitors of the adjacent pixels 202 after performing sampling and holding. Although this is expressed as a binning read-out mode (pixel average mode) according to the present exemplary embodiment, since charges of the sample hold capacitor are distributed over the sample hold capacitor to be averaged, an output level is averaged. In the S and N circuits, pixels are independently averaged. Further, the pixel average transistor is turned ON when the pixel average control line is "H".

According to pixel areas in which pixels are averaged, as illustrated in FIG. 11, average modes of 4 pixel average (2 pixels×2 pixels), 16 pixel average (4 pixels×4 pixels), and 64 pixel average (8 pixels×8 pixels) are obtained. Then, a horizontal scanning circuit and a vertical scanning circuit are driven according to each average mode and an image signal is readout from each pixel. In this manner, the binning read-out is executed.

Figure 12:
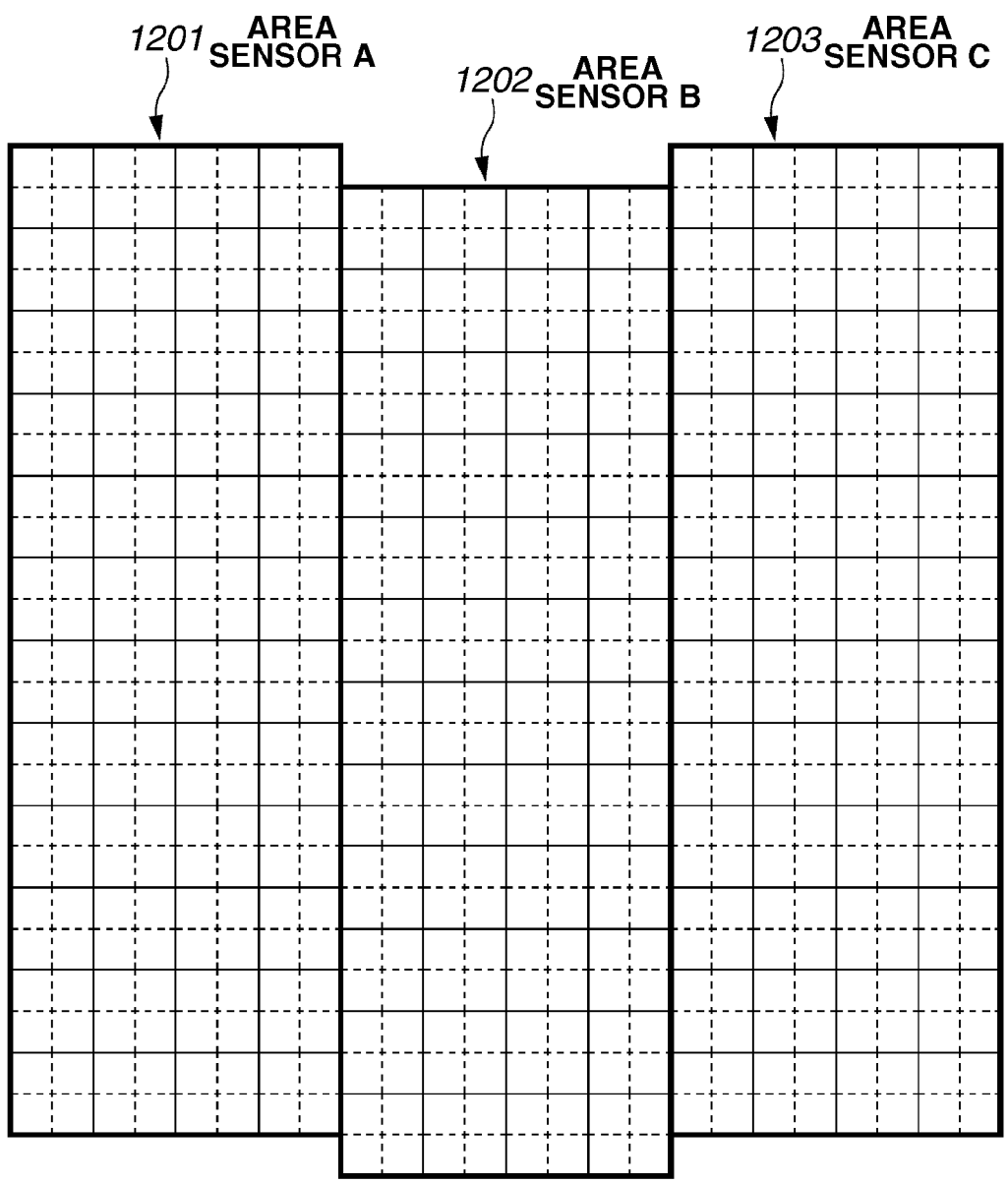
FIG. 12 is a schematic drawing illustrating a conventional example of a separation position of the binning area of each of the area sensors of the X-ray imaging apparatus.

FIG. 12 is a schematic drawing illustrating a conventional example of a separation position of the binning area of each of the area sensors of the X-ray imaging apparatus.

As illustrated in FIG. 12, if a unique separation position of a binning area is set for area sensors A 1201, B 1202 and C 1203, when misregistration of the area sensor occurs, the separation position of the binning area between the adjacent area sensors is also shifted. Thus, conventionally, a modulation transfer function (MTF) of each of the area sensors is deteriorated.

Figure 13:
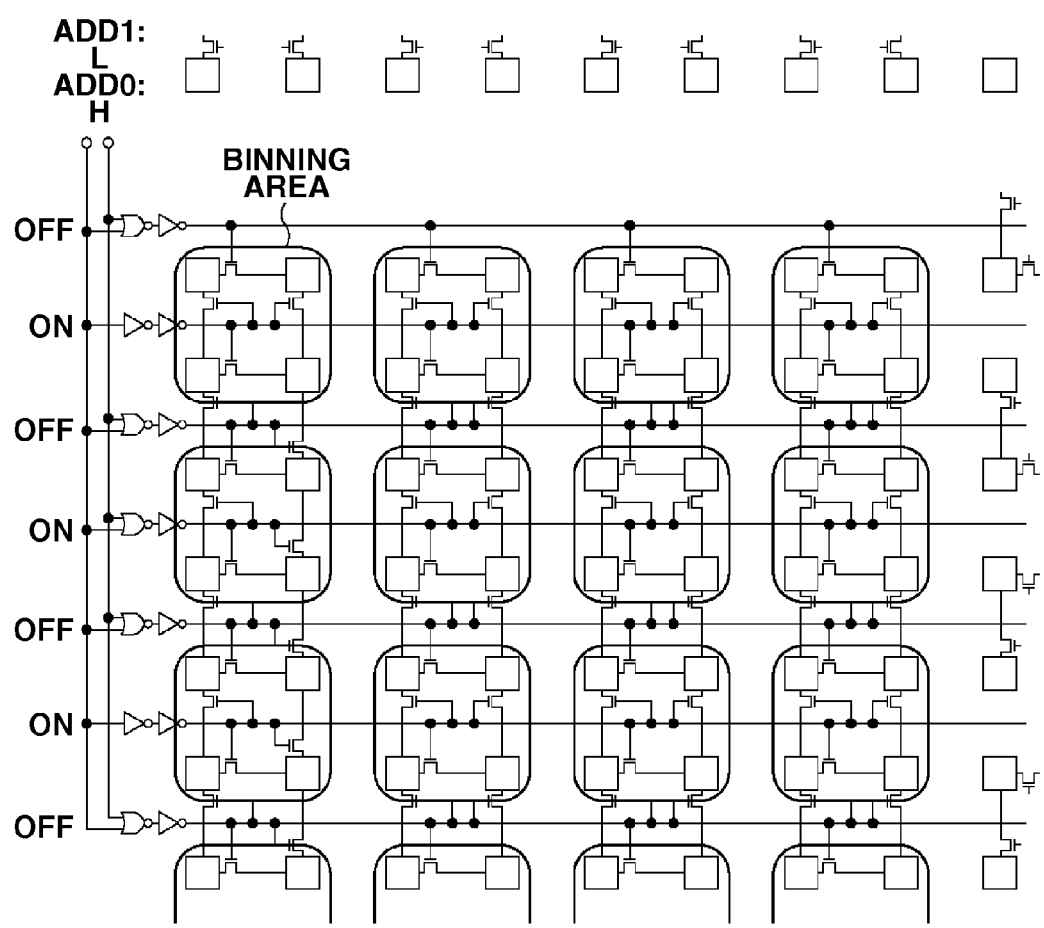
FIG. 13 is a schematic drawing illustrating an example of a binning line selection in each binning area of the area sensor according to the third exemplary embodiment of the present invention.
Figure 14:
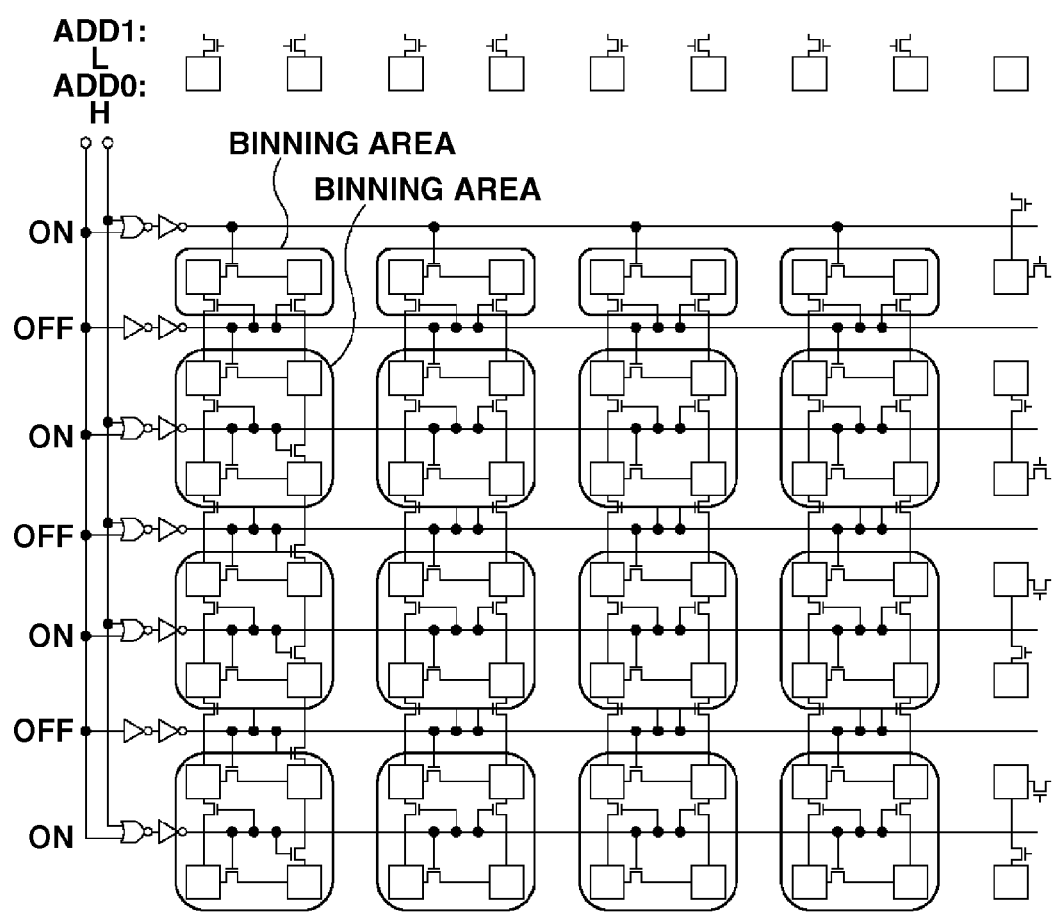
FIG. 14 is a schematic drawing illustrating an example of a binning line selection in each binning area of the area sensor according to the third exemplary embodiment of the present invention.

Processing of the present exemplary embodiment will now be described below. FIGS. 13 and 14 are schematic drawings illustrating examples of a binning line selection with respect to each binning area of an area sensor according to the third exemplary embodiment of the present invention. FIG. 15 is a schematic drawing illustrating an example of a separation position of a binning area of each of the area sensors of the X-ray imaging apparatus 120 according to the third exemplary embodiment of the present invention.

According to the present exemplary embodiment, when the pixel misregistration due to the misregistration of the area sensor is corrected by the control circuit 122, as illustrated in FIG. 13, the binning selection line is arranged alternately with the selection line of a different area sensor (see FIG. 14) in the area sensor which corrects the misregistration of an odd number of pixels. As a result, according to the present exemplary embodiment, as can be seen from area sensors A 1501, B 1502, and C 1503 illustrated in FIG. 15, the separation position of the binning area, which is surrounded by a solid line, is aligned in the whole imaging area, so that an X-ray image without a deteriorated MTF can be acquired.

According to the above-described embodiments, by setting the pixel area of the area sensor greater than one pixel or greater than the effective imaging area of the image sensor 121, even if misregistration of one pixel or greater is corrected, the pixel information exists over the whole effective pixel area and thus useful.

While the present invention has been described with reference to exemplary embodiments, it is to be understood that the invention is not limited to the disclosed exemplary embodiments. In the present specification, examples in which X-ray is applied as the radiation ray are described. However, the radiation ray herein includes X-rays, alpha rays, beta rays, and gamma rays. The scope of the following claims is to be accorded the broadest interpretation so as to encompass all modifications, equivalent structures, and functions.

This application claims priority from Japanese Patent Application No. 2009-086650 filed Mar. 31, 2009, which is hereby incorporated by reference herein in its entirety.

What is claimed is:

1. An imaging apparatus comprising:
   an image sensor in which a plurality of area sensors, each area sensor having a plurality of pixels, is arranged one-dimensionally or two-dimensionally; and
   a control circuit configured to control timing for reading out image data from each of the plurality of the area sensors based on area sensor arrangement information concerning arrangement of each of the plurality of the area sensors,
   wherein, if at least one area sensor among the plurality of the area sensors is shifted by half a pixel or greater, the control circuit performs control to correct pixel misregistration of the image data based on the area sensor arrangement information.

2. The imaging apparatus according to claim 1, wherein a shift register for output selection is provided for each of the plurality of the area sensors, and
   the control circuit controls assert timing of a start signal of the shift register for output selection as timing for reading out the image data from each of the plurality of the area sensors.

3. An imaging apparatus comprising:
   an image sensor in which a plurality of area sensors configured to include a plurality of pixels is arranged one-dimensionally or two-dimensionally; and
   a control circuit configured to control a write address used for writing image data read out from each of the plurality of the area sensors into a memory based on area sensor arrangement information concerning arrangement of each of the plurality of the area sensors,
   wherein, if at least one area sensor among the plurality of the area sensors is shifted by half a pixel or greater, the control circuit performs control to correct pixel misregistration of the image data based on the area sensor arrangement information.

4. An imaging apparatus comprising:
   an image sensor in which a plurality of area sensors, each area sensor having a plurality of pixels, is arranged one-dimensionally or two-dimensionally; and
   a control circuit configured to control timing for reading out image data from each of the plurality of the area sensors based on area sensor arrangement information concerning arrangement of each of the plurality of the area sensors,
   wherein the control circuit further performs control to change a separation position of a binning area when the image data is read out from each of the plurality of the area sensors based on the area sensor arrangement information.

5. An imaging apparatus comprising:
   an image sensor in which a plurality of area sensors, each area sensor having a plurality of pixels, is arranged one-dimensionally or two-dimensionally; and
   a control circuit configured to control timing for reading out image data from each of the plurality of the area sensors based on area sensor arrangement information concerning arrangement of each of the plurality of the area sensors,
   wherein a pixel area of the area sensor of the image sensor is at least one pixel greater than an effective imaging area.

6. The imaging apparatus according to claim 1, wherein the image data is radiation image data based on radiation transmitted through an object.

7. An imaging apparatus comprising:
   a plurality of area sensors arranged adjacent to each other to form an image sensor, each of the plurality of area sensors having a plurality of pixels;
   a storage unit configured to store area sensor arrangement information corresponding to each of the plurality of sensors that form the image sensor; and
   a control circuit configured to control timing for reading out image data from each of the plurality of area sensors based on the area sensor information stored in the storage unit,
   wherein, if at least one area sensor among the plurality of the area sensors is shifted by half a pixel or greater, the control circuit performs control to correct pixel misregistration of the image data based on the area sensor arrangement information.

8. The imaging apparatus according to claim 7, wherein the plurality of area sensors that form the image sensor are arranged in a one-dimensional array or a two-dimensional array, and
   wherein at least one of the plurality of area sensors is displaced by one pixel with respect to other area sensors of the plurality of area sensors.

9. The imaging apparatus according to claim 7, wherein the storage unit stores misregistration information as the area sensor arrangement information corresponding to at least one of the plurality of sensors that form the image sensor.

10. The imaging apparatus according to claim 7, wherein the image sensor formed by the plurality of area sensors is configured to capture a radiation image, and
    wherein the control circuit controls timing for reading out the image data of the radiation image from each of the plurality of area sensors based on the area sensor information stored in the storage unit.

11. An imaging apparatus comprising:

a plurality of area sensors arranged adjacent to each other to form an image sensor, each of the plurality of area sensors having a plurality of pixels;

a storage unit configured to store area sensor arrangement information corresponding to each of the plurality of sensors that form the image sensor; and a control circuit configured to control timing for reading out image data from each of the plurality of area sensors based on the area sensor information stored in the storage unit, wherein the control circuit further performs control to change a separation position of a binning area when the image data is read out from each of the plurality of the area sensors based on the area sensor arrangement information.

12. An imaging apparatus comprising:

a plurality of area sensors arranged adjacent to each other to form an image sensor, each of the plurality of area sensors having a plurality of pixels;

a storage unit configured to store area sensor arrangement information corresponding to each of the plurality of sensors that form the image sensor; and a control circuit configured to control timing for reading out image data from each of the plurality of area sensors based on the area sensor information stored in the storage unit, wherein a pixel area of the area sensor of the image sensor is at least one pixel greater than an effective imaging area.

* * * * *